United States Patent
Erny

[11] Patent Number: 5,879,616
[45] Date of Patent: Mar. 9, 1999

[54] METALLURGICAL VESSEL AND METHOD OF USING THE SAME

[75] Inventor: Edward L. Erny, Bethel Park, Pa.

[73] Assignee: Harbison-Walker Refractories Company, Pittsburgh, Pa.

[21] Appl. No.: 872,829

[22] Filed: Jun. 11, 1997

Related U.S. Application Data

[63] Continuation-in-part of Ser. No. 589,709, Jan. 22, 1996, Pat. No. 5,824,263.

[51] Int. Cl.$^6$ ..................................................... C21B 7/12
[52] U.S. Cl. .............................. 266/45; 266/236; 266/275
[58] Field of Search ................................ 266/236, 230, 266/275, 45; 222/590, 591, 594

[56] References Cited

U.S. PATENT DOCUMENTS

| | | | |
|---|---|---|---|
| 229,724 | 7/1880 | Mann et al. | 52/249 |
| 2,526,289 | 10/1950 | Smith | 52/249 |
| 3,516,478 | 6/1970 | Dunn et al. | 164/281 |
| 3,550,924 | 12/1970 | Grosko | 266/275 |
| 3,695,604 | 10/1972 | Stein | 266/43 |
| 3,831,659 | 8/1974 | Gerding et al. | 266/236 |
| 3,972,516 | 8/1976 | Napora | 266/283 |
| 4,746,102 | 5/1988 | Gilles et al. | 266/236 |
| 5,196,051 | 3/1993 | Heaslip et al. | 75/582 |
| 5,597,528 | 1/1997 | Whaley | 266/236 |

FOREIGN PATENT DOCUMENTS 1 188 073   6/1985   Canada .

OTHER PUBLICATIONS

SHAMVA Catalog No. 102, Mullite Refractory Brick and Special Shapes, H.K. Porter Company, Inc. pp. 5–23, especially p. 22, dated Jan. 2, 1958.

*Primary Examiner*—Scott Kastler
*Attorney, Agent, or Firm*—Craig G. Cochenour

[57] ABSTRACT

A metallurgical vessel having a sloping bottom surface which includes a tapered upper surface terminating at a vertical surface, wherein the vertical surface terminates at a lower tapered surface for forming a pocket block reservoir such that the pocket block reservoir has a volume of less than or equal to about five percent of the total volume of the metallurgical vessel is disclosed. This pocket block reservoir provides an area for the accumulation of residue metal and slag when the metallurgical vessel is discharged, therefore resulting in a significant increase in the quantity of usable pure metal discharged from the metallurgical vessel and thus contributing to improved volumetric efficiency of the vessel. A method for improving the yield efficiency in the production of metal employing this vessel is also provided.

12 Claims, 11 Drawing Sheets

METALLURGICAL VESSEL AND METHOD OF USING THE SAME

CROSS REFERENCE TO RELATED APPLICATIONS

This application is a Continuation-in-part (under 37 C.F.R. §1.53) of U.S. patent application Ser. No. 08/589,709 filed Jan. 22, 1996, now U.S. Pat. No. 5,824,263. The entirety of such patent application is specifically incorporated herein by reference.

BACKGROUND OF THE INVENTION

1. Field of Invention

This invention relates to an improved metallurgical vessel and a method of employing the same for improving the efficiency of use of high temperature metallurgical vessels and more particularly relates to providing for an increase in the useable quantity of molten metal withdrawn from such vessels.

2. Brief Description of the Background Art

As will be recognized by those skilled in the art, in high temperature vessels such as molten steel ladles, one problem heretofore encountered relates to preventing slag from contaminating or otherwise being mixed with the relatively pure steel when it is being withdrawn from the vessel. Since slag is less dense than the molten steel, the slag tends to rise and accumulate on top of the underlying steel. If a pouring orifice is provided in the bottom of the vessel, relatively uncontaminated molten steel can be withdrawn simply by opening the orifice to permit the liquid steel to exit therethrough. However, when the liquid surface falls until it is near the bottom of the vessel, pouring must stop before slag exits along with the remaining steel; and thus a quantity of steel remains in the vessel and is unusable. In order to keep this unusable quantity of molten metal as small as practicable, it has become customary to provide sloping bottoms with a low point at or near the edge of the vessel where a pouring orifice is positioned. However, this has brought about a relative inefficiency in refractory brick installation and utilization.

A variety of designs and processes have been proposed to improve efficiency of metallurgical vessels such as, for example, molten steel ladles.

U.S. Pat. No. 5,196,051 (Heaslip et al.) discloses ladle bottom geometries having sloping surfaces whereon there are positioned pluralities of castellations for reducing vortices that otherwise might entrain slag or other impurities in the exiting liquid as the ladle is emptied.

U.S. Pat. No. 4,746,102 (Gilles et al.) discloses a multi diameter drain hole design and a drain hole closing valve in the bottom of a metallurgical ladle for reducing the yield loss from the metallurgical ladle wherein the metallurgical ladle has liquid metal having a layer of slag on the liquid metal.

In spite of this background material, there remains a very real and substantial need for an improved metallurgical vessel for increasing efficiency of refractory brick utilization and/or for increasing the quantity of usable molten metal such as, for example, steel, that may be poured from a metallurgical vessel such as, for example, a ladle. It will be appreciated by those persons skilled in the art that because of the large sizes and holding capacities of typical ladles and the volume of steel normally carried therein, even a relatively small percentage increase in volumetric efficiency translates into a large absolute volume and correspondingly large cost savings providing substantial economic advantages.

SUMMARY OF THE INVENTION

The present invention has met the above described needs. The present invention provides a metallurgical vessel for holding a molten metal having a layer of slag thereon. The metallurgical vessel comprises a shell having a metallic exterior and a refractory lined interior wherein the refractory lined interior has sides and a sloping bottom surface. The sloping bottom surface has a tapered upper surface terminating at a vertical surface; the vertical surface terminates at a lower tapered surface for forming a pocket block reservoir. The pocket block reservoir of the instant invention has a volume of less than or equal to about five percent of the total volume of the metallurgical vessel. The pocket block reservoir includes a pouring orifice (i.e. tap hole) located at the lower tapered surface for draining the molten metal from the metallurgical vessel. The improved metallurgical vessel of the instant invention provides the pocket block reservoir for the formation of a pool of increased depth in which, for example, the residue of molten metal and slag accumulate when the ladle is almost empty during the discharge of steel from the metallurgical vessel. Accordingly, the quantity of usable steel is significantly increased, thus contributing to improved volumetric efficiency of the metallurgical vessel.

A method for improving the yield efficiency of a metallurgical vessel for holding a molten metal having a layer of slag thereon employing the metallurgical vessel of the instant invention is also provided.

OBJECTS AND FEATURES OF THE INVENTION

It is one general object of the invention to improve volumetric efficiency of high temperature refractory lined metallurgical vessels.

It is another object of the invention to facilitate use of such vessels in which the bottoms are sloped either to one side or toward the center.

Accordingly, in accordance with a feature of the invention, a small but deep well-like reservoir (i.e. pocket block reservoir) is provided adjacent to the vessel exit orifice, thus increasing the volume of relatively pure high temperature liquid metal that can be poured from the vessel.

In accordance with another feature of the invention, the small well-like reservoir (i.e., pocket block reservoir) is disposed at the vessel exit orifice, thus further contributing to efficiency in draining the vessel of uncontaminated liquid contents.

These and other objects and features of the invention will be apparent from the following description, by way of example of preferred embodiments, with reference to the drawings.

BRIEF DESCRIPTION OF THE DRAWINGS

FIG. 6A' is a perspective view illustrating a single unit pre-fabricated module of a part of a half ring of FIG. 6.

FIG. 6B' is a perspective view illustrating a single unit prefabricated module of another part of the half ring of FIG. 6.

DETAILED DESCRIPTION OF THE INVENTION

As used herein the term pocket block reservoir means a region surrounding or in other geometric union with a pouring orifice (i.e. tap hole) in the bottom of a metallurgical vessel having a refractory lined bottom. The tap hole is a hole in the bottom of the vessel through which a liquid material such as, for example but not limited to, molten steel, is drained from the vessel.

While the instant invention is applicable to metallurgical vessels broadly, it will be described in connection with ladles.

Figure 1:
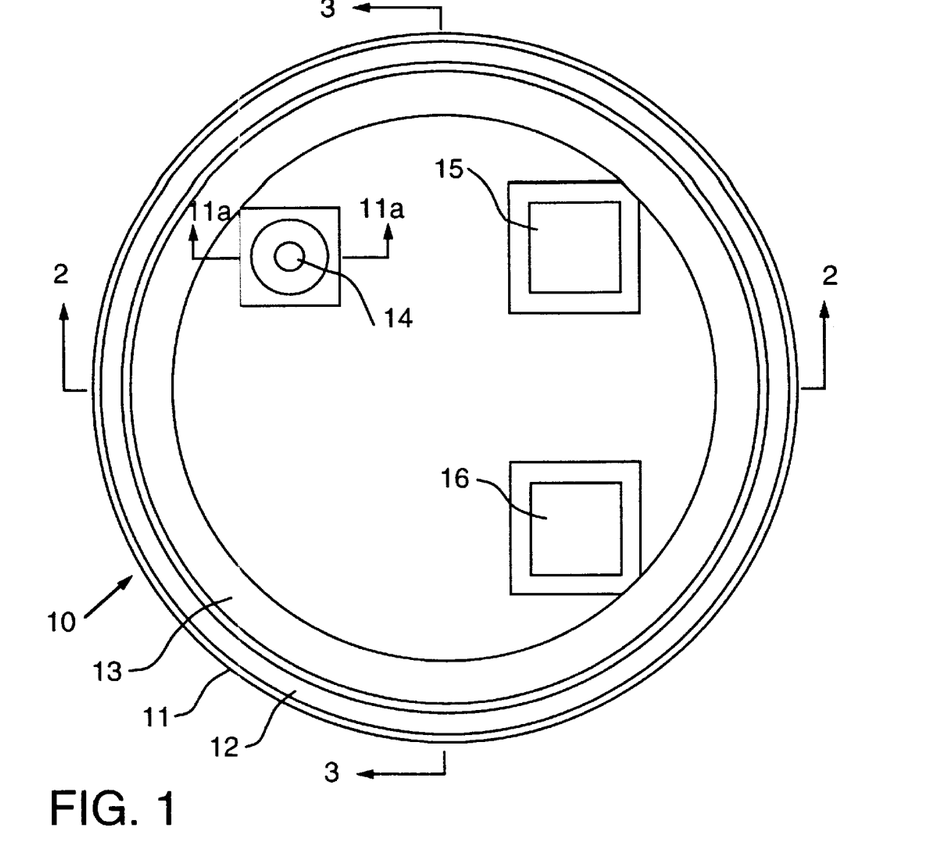
FIG. 1 is a top view of a typical refractory-lined vessel used for handling molten metal.

Now turning to the drawing, and more particularly FIG. 1 thereof, it will be seen to depict a typical circular metallurgical vessel, such as for example ladle 10 employed in the steel-making industry for handling molten metal such as, for example, steel. The vessel typically includes an outer metal shell 11, a first lining of refractory bricks 12, and an interior lining of refractory bricks 13. Included within the interior bottom are conventional tap hole 14, and injector locations 15 and 16. Injectors are not necessarily employed in all ladles. The tap hole is preferably located at or near the lowest point of the sloped bottom of the vessel which, in the embodiment of FIG. 1, is offset (as shown) from the center to a location adjacent the exterior wall. The offset for injectors 15 and 16 as shown in FIG. 1 is to accommodate other equipment.

Figure 2:
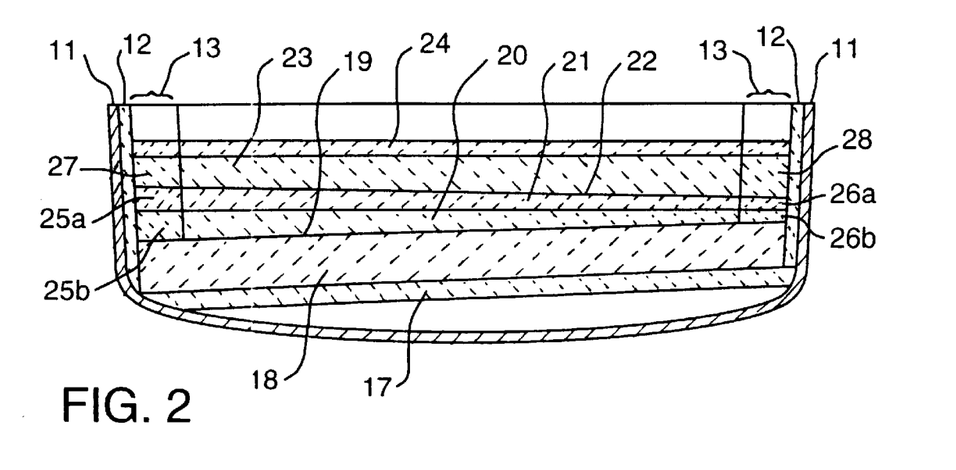
FIG. 2 is a partial sectional view taken along the section lines 2—2 of FIG. 1.
Figure 3:
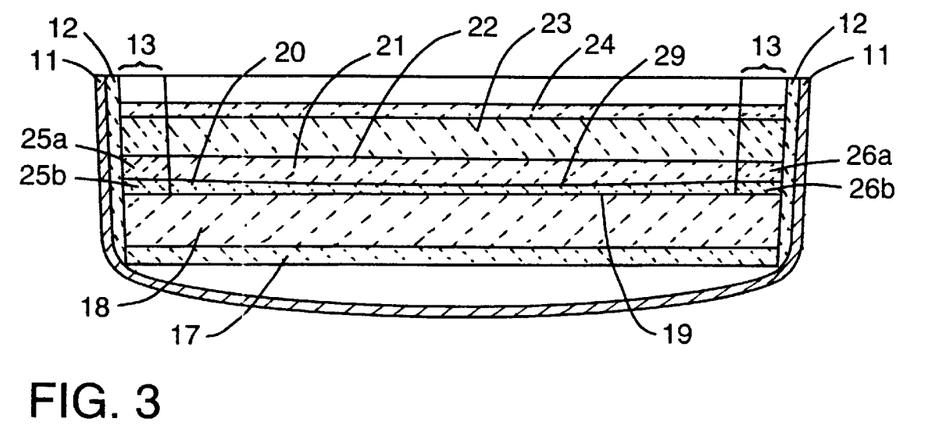
FIG. 3 is a partial sectional view taken along the section lines 3—3 of FIG. 1.

To further illustrate the interior of the metallurgical vessel shown in FIG. 1 and to depict the leveling courses of refractories constructed according to the instant invention, sections 2—2 and 3—3 are shown respectively in FIGS. 2 and 3. FIG. 2 shows two layers 17 and 18 of refractories that typically line the bottoms of high temperature metallurgical vessels such as, for example, liquid steel handling vessels. It will be observed that FIG. 2 shows these two layers 17 and 18 are each generally of uniform thickness and are installed to present a sloping upper surface 19 of element 18 which slopes down toward tap hole 14 (not shown) so as to facilitate draining of molten metal, for example, steel, from the vessel. As mentioned above, such sloping surface provides advantages. However, in order to provide the aforementioned leveling, the instant invention provides a pair of tapered layers 20 and 21 are installed so that the upper surface 22 of layer 21 is essentially level as shown in FIG. 2. Accordingly, FIG. 2 shows successive courses of bricks as represented by courses 23 and 24 are essentially parallel to the plane containing the mouth (not shown) of the vessel 10 so that the course of the more slag-resistant (and expensive) refractories described above need be of minimum height. If the dimensions of the ladle are such that the ends of the tapered layers 20 and 21 are not adjoining, they can be made to "communicate", i.e., form a ring with the use of transition refractories. At both ends of tapered layers 20 and 21 there are shown transition refractories 25a/25b and 26a/26b, respectively, which connect with the layers and abut conventional side wall refractories 27 and 28, respectively. Refractories 25a/25b and 26a/26b are splits or soaps which are not tapered and are of the same thickness (height) of the adjacent brick in the ring.

FIG. 3 shows the geometrical relationship of the foregoing courses of refractories at an angle of 90 degrees to that of FIG. 2; and like parts are, of course, identified with like symbols. There, the leveling courses 20 and 21 are shown, with surface 22 of layer 21 being essentially level, and with the line 29 between layers 20 and 21 reflecting the tapering and curved nature of the interior of the vessel.

Figures 4, 5A:
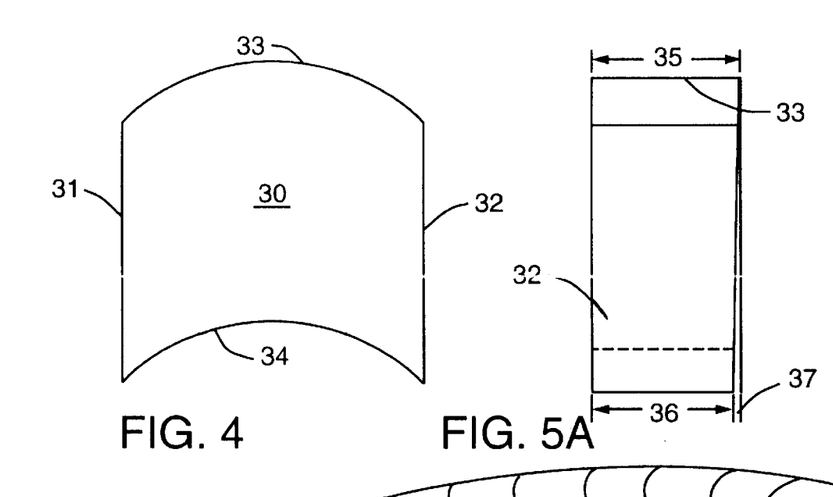
FIG. 4 is top view of a universal shape preferred for practicing the invention.
FIG. 5A is a side view of the shape of FIG. 4.
Figure 5B:
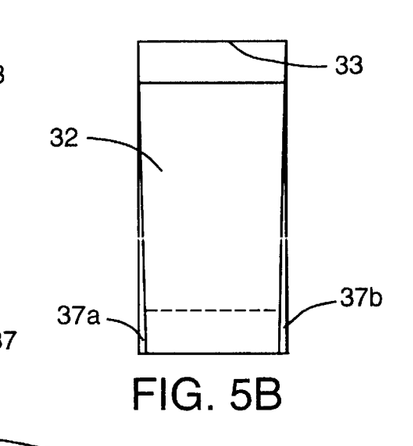
FIG. 5B is a side view of an alternative shape to that set forth in FIG. 5A.

FIGS. 4, 5A and 5B show refractory shapes according to the first preferred embodiment of the instant invention. FIG. 4 is a top view of a particular universal shape 30 preferred for practicing the invention. Full universal shapes which have equal inner and outer faces are preferred since the same shapes can be used for the two half-rings. Semi-universal shapes are also suitable, but because of their thickness taper, they require "left" and "right" shapes having taper in opposite directions, or one of the mirror image half rings must be inverted. Also suitable are semi-universal key, circle, wedge brick, and the like. FIG. 4 shows that refractory shape 30 includes a pair of substantially parallel surfaces 31 and 32, together with a pair of curved surfaces 33 and 34 which are complementary and provide for form fitting of adjacent bricks as set forth in FIG. 6.

Figure 6:
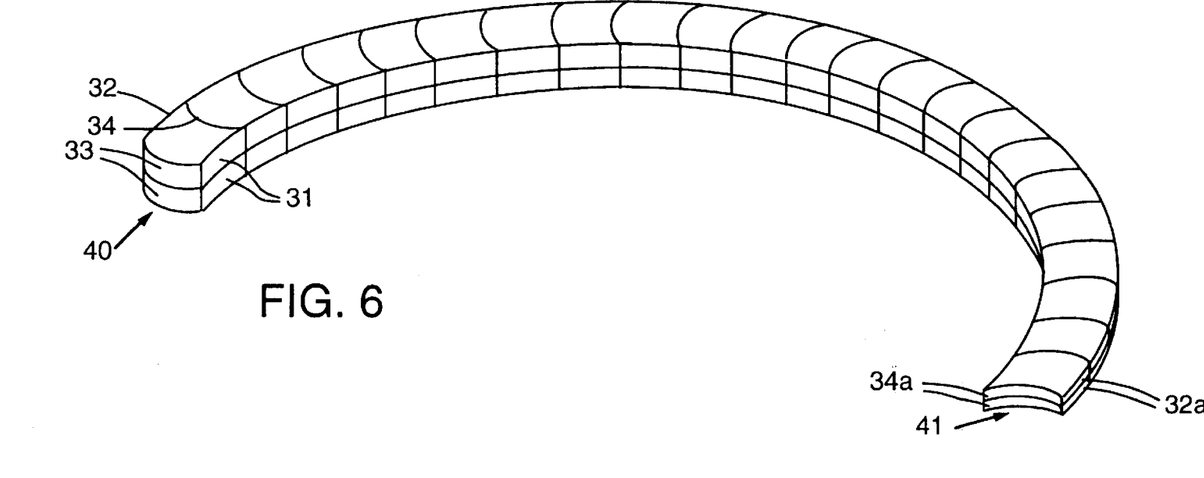
FIG. 6 is a perspective view illustrating one of two semicircular half rings of refractory bricks configured according to the invention.

FIG. 5A is a side view of the refractory brick of FIG. 4 and illustrates the gradual tapering feature that results in compensation as described herein. Thus, the height of the brick at end 33 as measured by dimension 35 is greater than the height of the brick at end 34 as measured by dimension 36; and the difference, as represented by dimension 37, results in a controlled taper in brick height which is progressive as set forth in FIG. 6. Thus, height of each brick in the representative half circle ring of FIG. 6 is different from each adjacent brick so as to result in a smooth taper from left end 40 to right end 41 as shown. Also, it should be observed that at right end 41, the much less high (shorter) refractories are shown and their relevant surfaces are identified by numerals 32a and 34a.

FIG. 5B illustrates another embodiment of the instant invention in that the taper as evidenced by dimension 37 of FIG. 5A is split into two parts 37a and 37b that is present at opposite surfaces.

It will be understood by those skilled in the art that in order for compensation (as described herein) of the instant invention to occur, the amount of taper is determined by the degree to which the bottom refractories 17 (FIG. 2) of the vessel 10 slope as evidenced by the slope of the upper surface of element 19 (FIG. 2). Therefore, the amount of taper from left end 40 to right end 41 (FIG. 6) will vary depending upon the taper of the bottom slope of the vessel.

FIG. 6 is a perspective view illustrating one of two semicircular half rings of semi-universal refractory bricks configured according to the invention, the complementary semicircular half ring being a mirror image of the half ring shown. FIG. 6 shows that there are two essentially identical courses of refractories, one overlying the other. To complete a full ring, the mirror image courses are adjoined at ends 40 and 41 to complete a circular installation as depicted in FIGS. 1–3. It will be understood by those skilled in the art that the number of courses of bricks will vary depending upon the slope of the vessel bottom and the taper of the bricks.

To join two half rings, "left" and "right" hand tapered brick is required. To avoid additional mold costs, a more practical approach is to cut the ends of both courses of both rings so that they mate at a plane vertical surface. If cutting is not possible, the gaps at the mating faces of the two half rings may be filled with monolithic refractory. This practice is not recommended but if impossible to avoid, a high strength refractory plastic or ramming mix should be used.

Figure 6A:
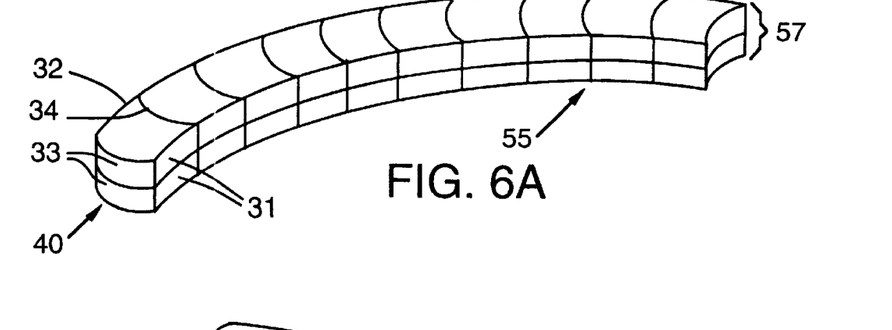
FIG. 6A is a perspective view illustrating a multi-unit prefabricated module of a part of the half ring of FIG. 6.
Figure 6B:
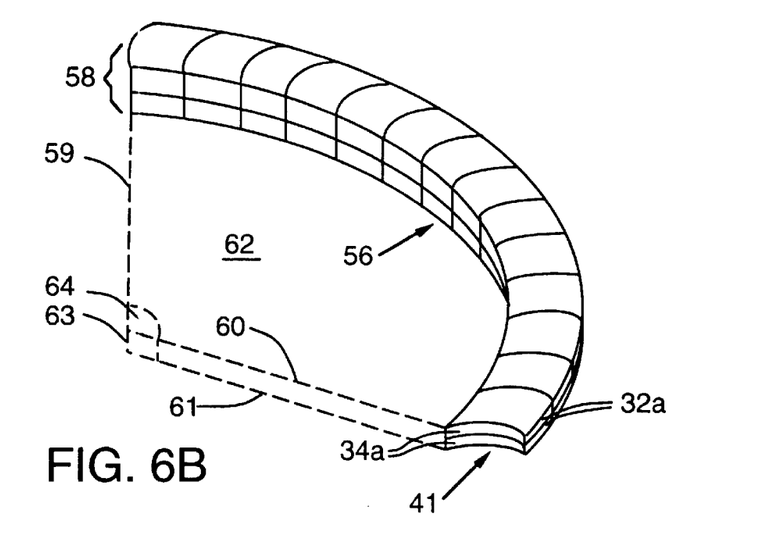
FIG. 6B is a perspective view illustrating a multi-unit prefabricated module of another part of the half ring of FIG. 6.

As mentioned herein, one of the features of the invention is its adaptability to modular prefabrication. FIGS. 6A and 6B illustrate multi-element modules 55 and 56 which when assembled together, form a half ring similar to that of FIG. 6. Thus, it will be appreciated by those skilled in the art that in order to assemble the modules of FIGS. 6A and 6B, ends identified with numerals 57 and 58 are brought into communication with each other.

Further examination of FIG. 6B reveals the presence of dashed lines 59, 60 and 61. These dashed lines represent an optional addition to the module of a pie-shaped segment 62 which comprises a pro-rata part of the refractory covering the bottom of the vessel. The apex 63 (FIG. 6B) of such pie-shaped segment may be truncated in embodiments having a center tap hole so as to remove the small region 64 and leave space for insertion of a refractory lined tap hole nozzle (not shown). It will be evident to those skilled in the art that a similar pie-shaped extension may be attached to each of the remaining modules such as, for example, module 55 (FIG. 6A).

The modules of FIGS. 6A and 6B may also be formed as unitary cast or rammed modules 55' and 56' (as depicted in FIGS. 6A' and 6B') which when assembled together, form a half ring similar to that of FIG. 6. Thus, in order to assemble the modules of FIGS. 6A' and 6B', ends identified with numerals 57' and 58' are brought into communication with each other.

Further examination of FIGS. 6A' and 6B' reveal the presence of dashed lines 59', 60' and 61'. These dashed lines (FIG. 6B) represent the above described optional addition to the module of a pie-shaped segment 62' which comprises a pro-rate part of the refractory covering the bottom of the vessel. The apex 63' of such pie-shaped segment may be truncated in embodiments having a center tap hole so as to remove the small region 64' and leave space for insertion of a refractory lined tap hole nozzle (not shown). It will be appreciated by those skilled in the art that a similar pie-shaped extension may be attached to each of the remaining modules such as, for example, module 55' (FIG. 6A').

Figure 7:
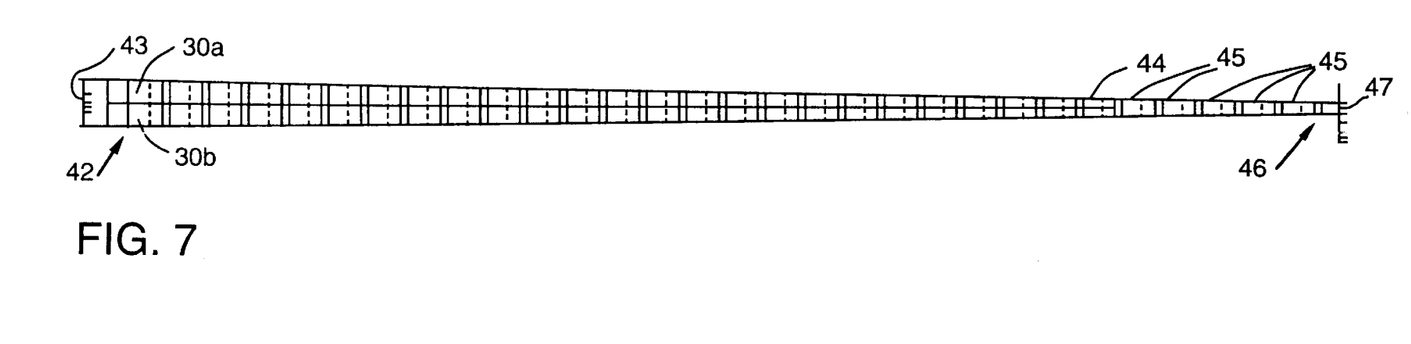
FIGS. 7, 7A and 7B are linear views (elevations) depicting a modification of FIG. 6 in which two courses of refractory bricks overlie one another for the principal part of the semicircle, while the thinner end is comprised of a single layer only.

FIG. 7 is a side view depicting a modification of FIG. 6 in which two courses of bricks overlie one another for the principal part of the semicircle, while the thinner end is comprised of a single layer only. Thus at left end 42 the overlying nature of the courses is represented by overlying refractories 30a and 30b which in one illustrative embodiment result in a total course height at end 42, such as, for example but not limited to, about 8.5 inches, as shown by dimension 43. In this embodiment, the dual geometry of the courses continues to point 44 at which the total height has declined such that the remainder includes just one brick 45. In the illustration hereof, the height at end 46 has decreased to such as, for example but not limited to, 1.25 inches, as shown by dimension 47.

Figure 7A:
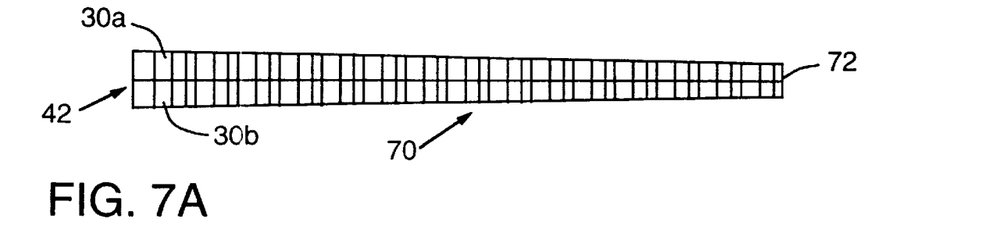
Figure 7B:
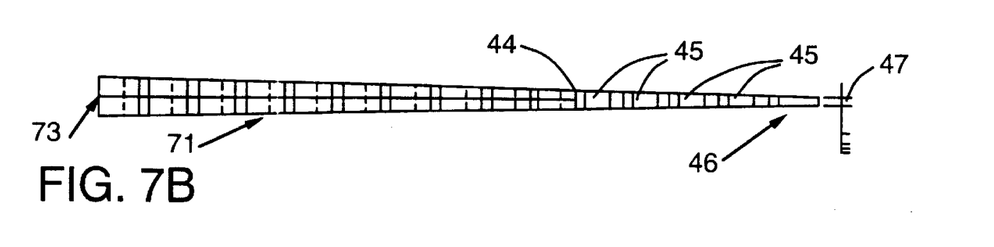

For embodiments corresponding to those of FIGS. 6A and 6B, there may be provided sections similar to sections 70 and 71 as shown in FIGS. 7A and 7B, respectively. There, ends 72 (FIG. 7A) and 73 (FIG. 7B) are brought into communication when the sections are assembled.

Figure 8:
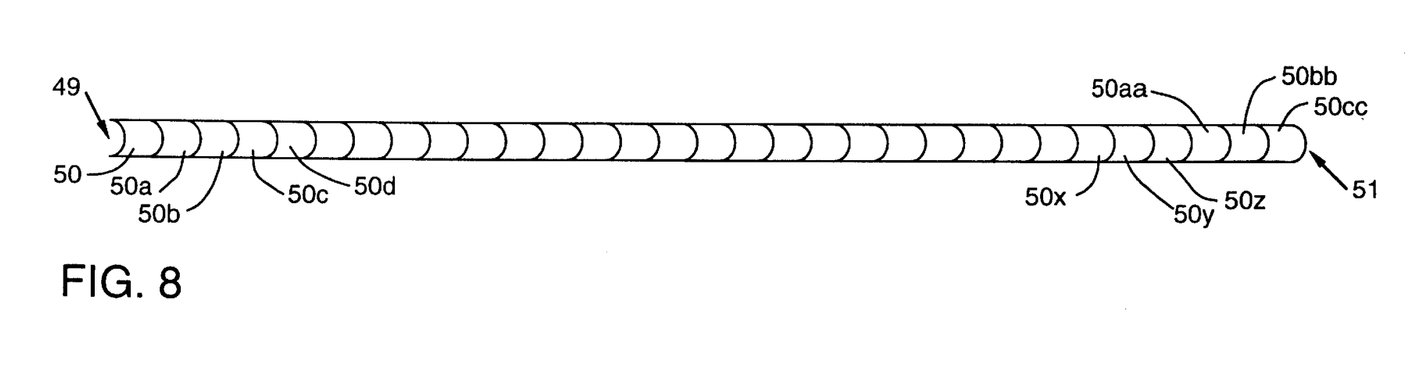
FIGS. 8, 8A and 8B show a top view illustrating tapered refractories of the general type shown in FIG. 4.

As mentioned herein, the principles of the invention may have applicability to non-circular vessels; and to illustrate such, there is included the array shown in FIG. 8. FIG. 8 shows a top view illustrating tapered refractories of the general type shown in FIG. 4. Beginning at the left end 49 of the array are courses 50–50d which continue to right end 51 which concludes with course 50cc. As with the configurations previously described, the degree of taper provided by refractories 50 through 50cc is complementary to the corresponding slope of the lower surface of the vessel in which they are to be installed so as to provide leveling compensation. Thus the principle can be applied to linings comprising both curved and plane surfaces.

Figure 8A:
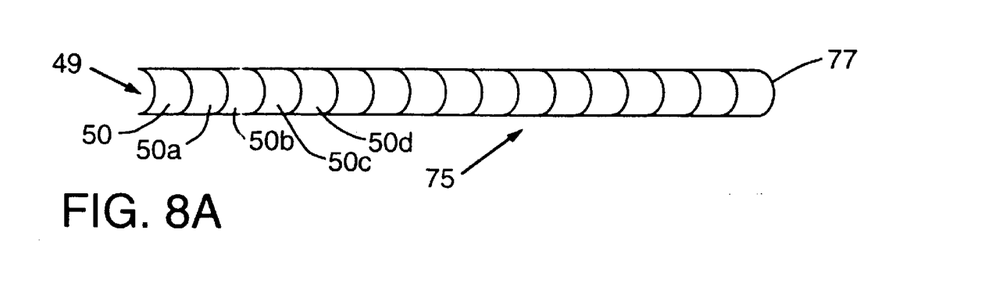
Figure 8B:
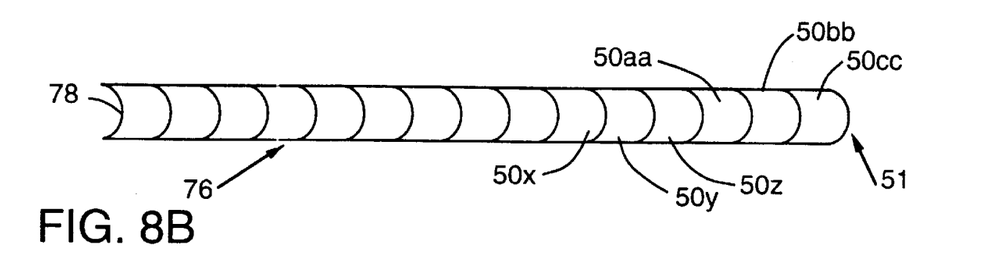

Again, to illustrate adaptability to modular prefabrication techniques, modules 75 (FIG. 8A) and 76 (FIG. 8B) are shown which, together, correspond to the array of FIG. 8. Again, as will be evident to those skilled in the art, assembly of the modules involves bringing ends 77 (FIG. 8A) and 78 (FIG. 8B) into communication with each other.

Figure 9:
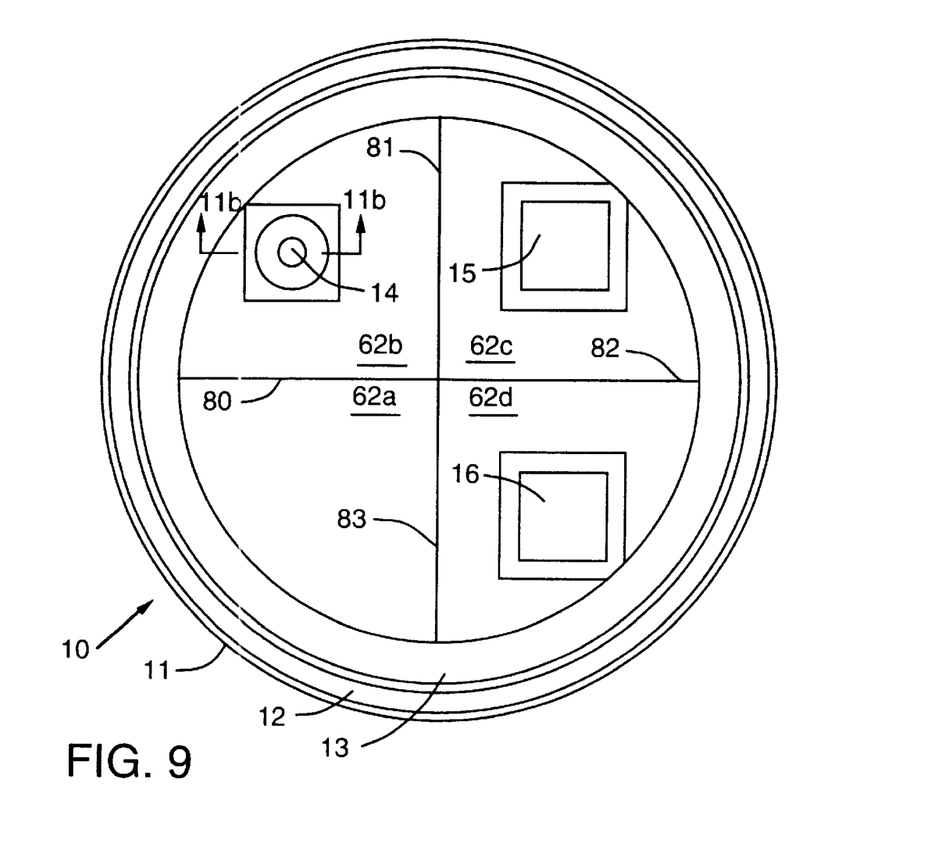
FIG. 9 is a top view of the vessel of FIG. 1 when quarter circular modules with bottom extensions are employed.

FIG. 9 sets forth a top view of the vessel of FIG. 1 when quarter circular modules with bottom extensions (such as those represented by the module 56' and extending bottom pie slice segment 62' of FIG. 6B') are in place, and showing the pie slice-like sections 62a–62d of the bottom refractory material. It will be appreciated by those skilled in the art that pie slice sections 62b, 62c and 62d are modified as needed to accommodate offset tap hole 14 and injector locations (i.e. injector ports) 15 and 16. It will also be appreciated that lines 80, 81, 82 and 83 (FIG. 9) represent the lines of communication between adjacent pie slices.

Figure 9A:
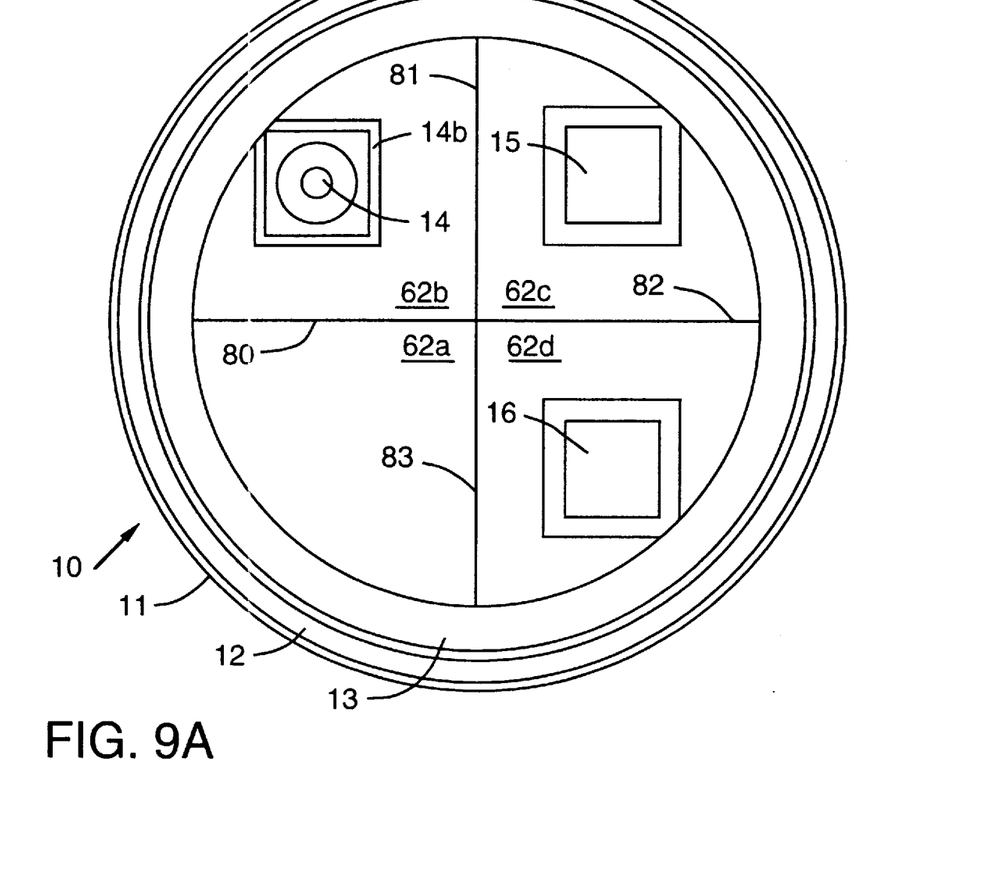
FIG. 9A is a top view of the vessel of FIG. 1 including a pocket block reservoir in accordance with the instant invention.

FIG. 9A shows another embodiment of the present invention and is a view similar to that of FIG. 9 except that in FIG. 9A there is shown schematically a pocket block reservoir 14b in accordance with the most preferred embodiment of the invention hereof. As known by those skilled in the art, when molten metal is ready for tapping into a metallurgical vessel such as, for example, a ladle, with the slag blanket remaining essentially on the free surface of the metal, such as, for example, steel, a portion of the slag is transferred to the ladle. It is customary in the art to fill a ladle with molten metal with the slag layer above the molten metal about two to ten inches or more deep. An inert gas, such as, for example, argon, is bubbled through the molten metal via the injection locations (i.e. injector ports) into the ladle to homogenize the metal, thus freeing entrapped slag from the liquid metal and to reestablish and redefine the slag-metal interface, as mentioned hereinbefore. The ladle is then drained through a pouring orifice (i.e. tap hole) at a predetermined rate depending on the casting rate. The draining rate of the ladle is controlled with a tap hole cover means such as, for example but not limited to, a slide gate mechanism at the bottom of the pouring orifice (i.e. tap hole). As the molten metal is drained from the ladle, the slag layer remains above the molten metal until the level of molten metal approaches the bottom of the ladle. The slag is then drawn down into the discharge stream and becomes entrapped in the molten steel. This entrapment causes unacceptable impurities and surface defects in the final product. Heretofore, the draining of the ladle was prematurely stopped resulting in several tons of unusable molten metal left behind in the ladle. As described herein, the most preferred embodiment of the present invention, an improved metallurgical vessel increases the yield of usable steel available when the metallurgical vessel is drained.

Figure 11A:
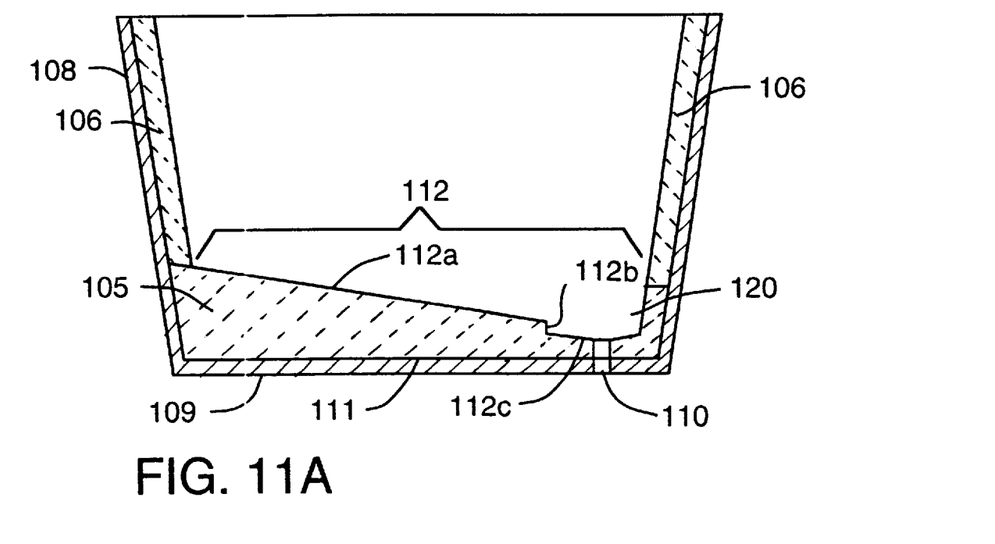
FIGS. 11A and 11B are sectional views of the sloping bottom surface and pocket block reservoir of the metallurgical vessel of the instant invention.
Figure 11B:
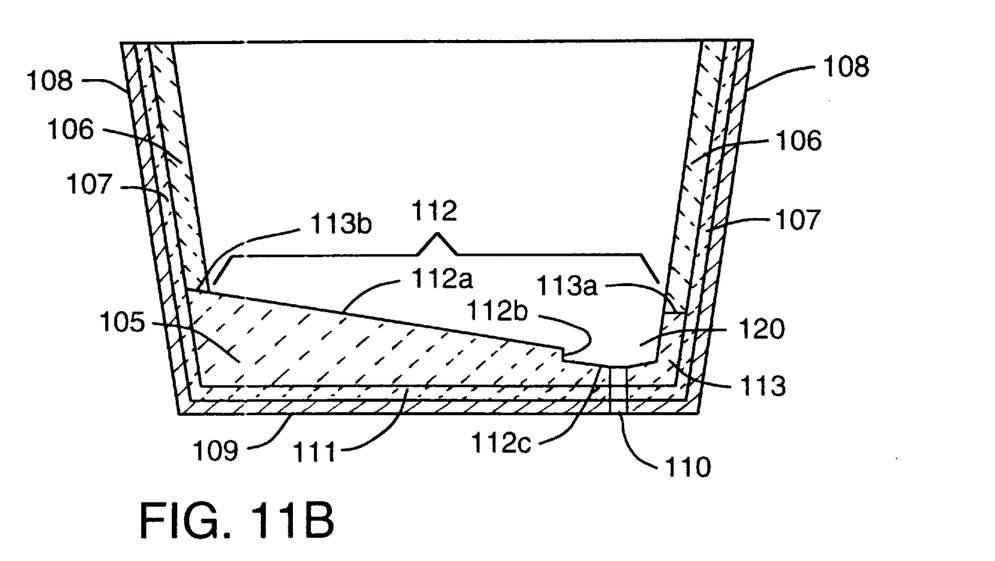

The most preferred embodiment of the present invention, as set forth in FIGS. 11A and 11B, provides a metallurgical vessel for holding a molten metal having a layer of slag thereon comprising a shell 108 having a metallic exterior and a refractory lined interior. The refractory lined interior has sides 106 and a sloping bottom surface 112 exposed to the interior of the vessel. The sloping bottom surface 112 of the vessel has a tapered upper surface 112a terminating at a vertical surface 112b. The vertical surface 112b terminates at a lower tapered surface 112c for forming a pocket block reservoir 120. The pocket block reservoir 120 has a volume of less than or equal to about five percent of the total volume of the metallurgical vessel. In another embodiment of this invention the pocket block reservoir 120 includes a tap hole 110 located at the lower tapered surface 112c for draining the molten metal from the metallurgical vessel. It is preferred that the sloping bottom surface 112 of the vessel have an angle of inclination of greater than or equal to about three degrees. Most preferably, the pocket block reservoir 120 has a volume of less than or equal to about three (3) percent of the total volume of the metallurgical vessel.

Another embodiment of this invention includes providing an impact pad (not shown in FIGS. 11a and 11b), as known by those skilled in the art, positioned on the sloping bottom surface 112 of the vessel.

It will be appreciated by those skilled in the art that the tap hole of the metallurgical vessel of the instant invention is advantageously placed near or preferably located at a lower region of the pocket block reservoir. Thus, the tap hole may be offset in the pocket block reservoir area or the tap hole may be located at the center of the pocket block reservoir.

Another embodiment of the present invention provides a method for improving the yield efficiency of a metallurgical vessel for holding a molten metal having a layer of slag thereon comprising employing a metallurgical vessel comprising a shell having side walls and a bottom to form an interior of said metallurgical vessel for containing a molten metal; forming a refractory lining covering the interior of the side walls and bottom of the vessel wherein the refractory lining forms a sloping bottom surface exposed to the interior of the vessel, wherein the sloping bottom surface has a tapered upper surface terminating at a vertical surface, the vertical surface terminating at a lower tapered surface for forming a pocket block reservoir, the pocket block reservoir having a volume of less than or equal to about five percent of the total volume of the vessel, and the pocket block reservoir having a pouring orifice (i.e. tap hole) having an opening located at the lower tapered surface for providing drainage of the vessel, wherein the tap hole has a removable tap hole cover means in juxtaposition to the tap hole for opening and closing the tap hole opening; placing the removable tap hole cover means in the closed position under the tap hole opening; placing the molten metal into the vessel and allowing sufficient volume for a layer of slag on top of the molten metal within the vessel for the formation of a slag-molten metal interface; draining the vessel by moving the removable tap hole cover means in the open position for allowing the molten metal within the vessel to collect in the pocket block reservoir and then to pass through the tap hole opening; and moving the removable tap hole cover means in the closed position simultaneously with, before or after the entry of said slag into the pocket block reservoir for increasing the yield of usable molten metal discharged from the vessel.

In a preferred embodiment, the method of this invention, as described herein, includes employing the sloping bottom surface having an angle of inclination of greater than or equal to about three (3) degrees.

In a most preferred embodiment, the method of this invention, as described herein, includes employing a pocket block reservoir having a volume of less than or equal to about three (3) percent of the total volume of the vessel.

In a preferred embodiment, the method of this invention, as described herein, includes positioning the tap hole near or at the lowest region of the pocket block reservoir.

It will be appreciated by those skilled in the art that the pocket block reservoir of the instant invention may be employed alone or may be employed in combination with the metallurgical vessel brick leveling set or the precast module leveling assembly as described herein.

Thus, it will be understood by those skilled in the art that the present invention preferably provides an optimal slope over most or all of the bottom of the vessel coupled with a discrete well or reservoir, i.e. the pocket block reservoir as described herein, adjacent the pouring orifice (i.e. tap hole) wherein there is provided a region for a small pool of increased depth in which the residue of molten metal and slag accumulate when the vessel is almost empty. Accordingly, the quantity of usable metal is significantly increased, thus contributing to improved volumetric efficiency of the vessel. Such a pocket block reservoir is identified by reference symbol 14b in FIG. 9A; and it preferably surrounds the otherwise existing drain or pouring orifice (i.e. tap hole) 14 of the metallurgical vessel.

Figure 10:
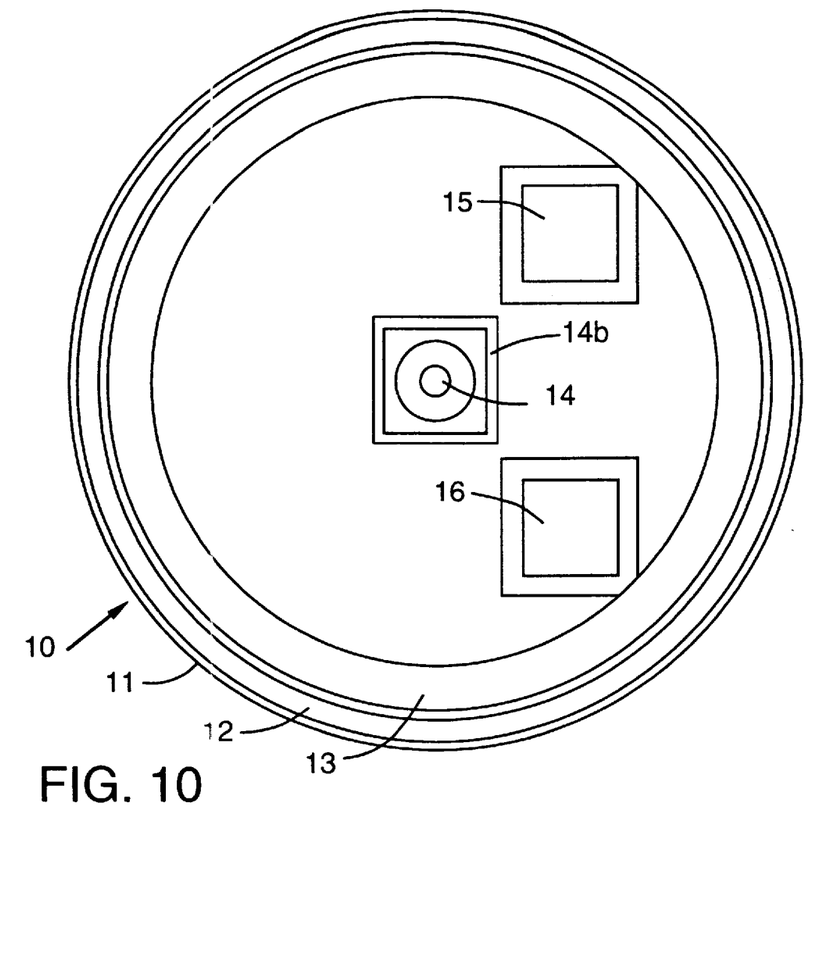
FIG. 10 is a top view of the vessel of FIG. 1 including a pocket block reservoir in accordance with the instant invention except that it includes a center tap hole rather than an offset tap hole.

FIG. 10 is a top view of a typical refractory-lined vessel similar to that of FIG. 1 except that it includes a center tap hole rather than an offset tap hole as was the case with the vessel set forth in FIG. 1. FIG. 10 shows injector locations 15 and 16 together with a centrally located tap hole 14 and the pocket block reservoir 14b of the present invention which surrounds the tap hole 14. Since, as mentioned above, it is most desirable to locate the tap hole at the lowest point in the vessel bottom, it will be appreciated that the bottom of vessel 10 slopes downwardly (and preferably symmetrically) from the outer steel shell 11 and its inner periphery adjacent interior lining 12 to tap hole 14. In such event, compensation for the sloping bottom can be made with identical refractories each having a planar top and a slanted bottom the slope of which corresponds to the slope of the adjacent part of the vessel bottom.

FIG. 11B sets forth a sectional schematic view of another example of the preferred embodiment of this invention similar to FIG. 11A and with elements bearing identical numeral designations where applicable, wherein the sloping bottom surface 112 and the pocket block reservoir 120 of the instant invention for increasing the yield of usable metal discharged from a metallurgical vessel is shown. FIG. 11B shows, for example, a monolithic pre-cast or cast in place refractory 105 together with courses of sidewall refractories 106 and safety refractories 107 there above. Lip 113 extends upwardly to a height such that the upper surface thereof is insubstantially the same horizontal plane of upper surface 113*b* of refractory 105. In FIG. 11B, the steel shell 108 has a flat bottom 109 with a pouring aperture (i.e. tap hole) 110. The monolithic pre-formed or cast in place refractory lining 105 has a bottom surface 111 parallel to the adjacent inner horizontal bottom surface of shell 108. However, in order to provide the aforementioned sloping interior surface for contact with metallurgical liquid, the pre-formed or cast in place refractory lining contains a sloping bottom surface 112 that slopes downwardly (as shown) to a low point at pouring orifice (i.e. tap hole) 110. The integral overlying lip 113 provides compensation for sloped monolithic bottom 105. The sidewall refractory lining, such as, for example but not limited to, either brick or monolithic, is then added to the generally horizontal faces 113*a*/113*b*. In the arrangement shown in FIG. 11A, the bottom surface 111 of the refractory lining 105 extends to the vessel shell 108. Alternatively, a "plug" construction may be employed whereby the sidewalls extend to the bottom of the shell (not shown). In this case, the bottom may be installed "inboard" of the sidewalls. It will also be evident to those skilled in the art that one or more safety linings 107 may be utilized between precast refractory 105 and steel shell 108.

It will be appreciated by those persons skilled in the art that the present invention provides numerous advantages over the background art. First, the present invention does not require costly modification of the existing pouring orifice or drain hole (i.e. tap hole) structure of an existing metallurgical vessel. Second, the present invention provides a metallurgical vessel having the pocket block reservoir, as described herein, that optimizes drainage of liquid metal thus resulting in a lower amount of unusable metal (i.e. metal with slag entrapment) remaining in the bottom of the vessel after the vessel is discharged. Therefore, it will be appreciated that the present invention provides for the optimal displacement of liquid metal and, thus results in a very significant volumetric yield improvement of usable metal. This translates into a tremendous economic benefit to metal producers, such as for example, in the steel industry. Third, the present invention provides an improved metallurgical vessel for increasing the volumetric yield of usable metal which requires no change in the general ladle steel making practice, including, but not limited to, not requiring any changes in caster practices, basic oxygen furnace or electric arc furnace practices. Fourth, the present invention, providing the metallurgical vessel having the pocket block reservoir, as described herein, does not require an increase of working lining reline time, does not require additional capital investment by the metal producer and does not require an increase in labor time. Lastly, the metallurgical vessel having the pocket block reservoir of this invention does not negatively impact ladle free opens, as will be appreciated by those persons skilled in the art.

Thus, it will be understood by those skilled in the art that the present invention not only solves a long unmet need in the metal industry of increasing the amount of usable metal discharged from a metallurgical vessel but also provides the above noted additional economic advantages.

Figure 12:
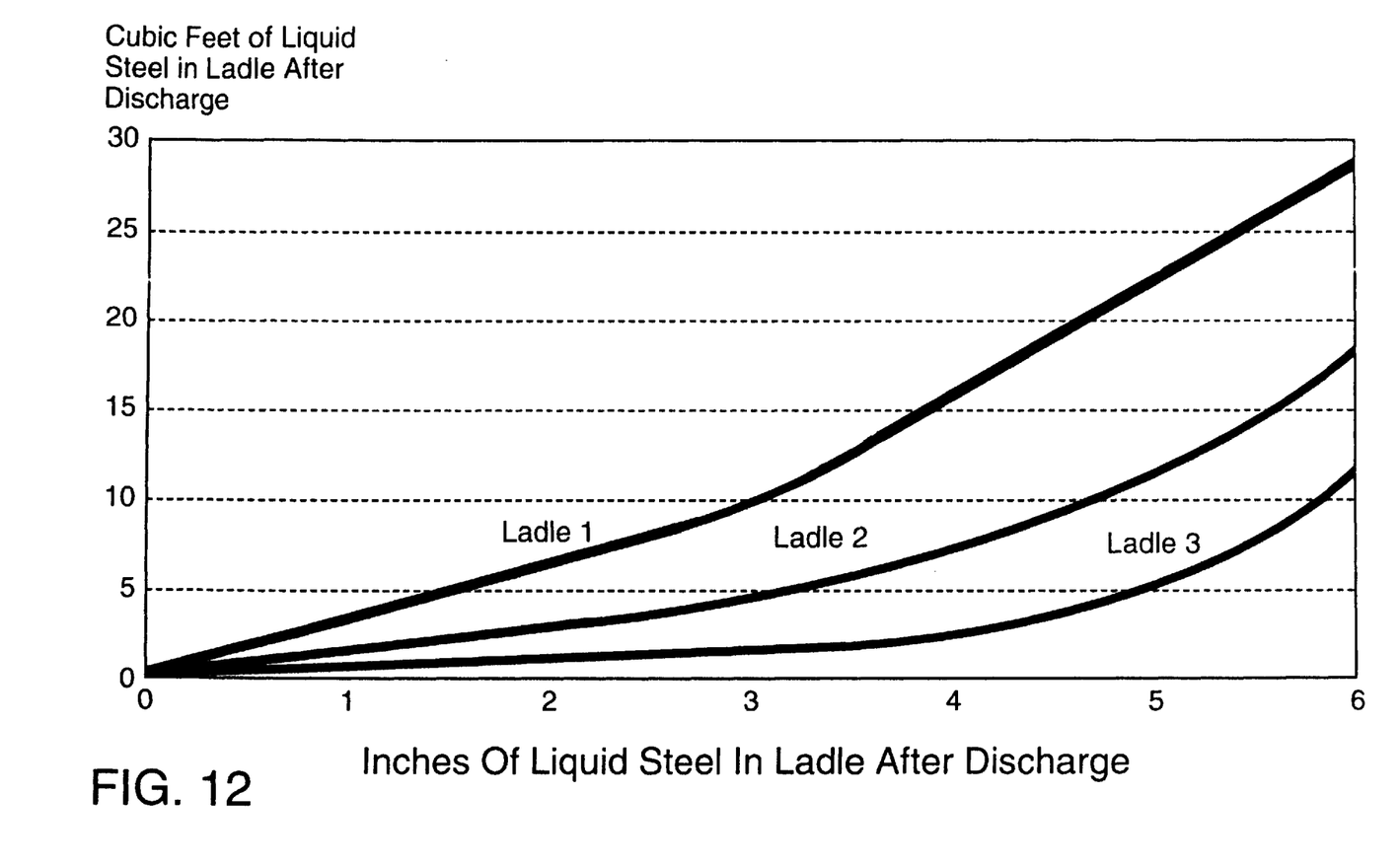
FIG. 12 shows the yield improvement achieved by employing the instant invention relative to current practice.

FIG. 12 shows the metal yield savings that result from the improvement provided by the metallurgical vessel of this invention. FIG. 12 sets forth the volume (in cubic feet) of unusable steel remaining in a ladle based upon inches of liquid unusable steel remaining in the bottom of the ladle after the ladle was discharged.

FIG. 12 shows the results when three ladles of uniform size but of different design were compared for quantifying the amount of liquid unusable steel remaining in the ladle bottom after discharge of the useable steel from the ladle. Ladle 1 is a standard known in the art flat bottom ladle. Ladle 2 is a standard known in the art sloped bottom ladle. Ladle 3 is a ladle having the sloped bottom and pocket block reservoir according to the instant invention. Each ladle was equipped with a conventional non proprietary pouring orifice (i.e. tap hole assembly). FIG. 12 shows that there were 2 inches of liquid unusable steel corresponding to six cubic feet of liquid unusable steel remaining in Ladle 1 (having a flat bottom design) post discharge. Further, FIG. 12 shows that there were 2 inches of liquid unusable steel corresponding to two and one-half cubic feet of liquid unusable steel remaining in Ladle 2 (having a sloped bottom design) after discharge of Ladle 2. FIG. 12 shows that there were two inches of unusable liquid steel corresponding to 0.8 cubic feet of liquid unusable steel remaining in Ladle 3 of the instant invention after discharge of Ladle 3. Thus it will be appreciated by those persons skilled in the art that the instant invention (Ladle 3) resulted in achieving the highest reduction of yield loss of liquid steel. Stated another way, it will be understood by those skilled in the art that the metallurgical vessel of the instant invention (Ladle 3) achieved the highest yield improvement of usable liquid steel discharged from a ladle in comparison to metallurgical vessels with known designs currently used in the steel industry (Ladles 1 and 2).

As will be appreciated by those skilled in this art, the precise dimensions of the pocket block reservoir of the instant invention may depend on the slope of the adjacent bottom surface of the vessel, the overall capacity of the vessel, and the possible positioning of geometrical objects such as, for example, the pouring impact pad and injector locations. It will be understood by those skilled in the art that the geometries of the instant invention described herein provide for improving volumetric pouring efficiencies of metallurgical vessels.

Whereas particular embodiments of the instant invention have been described for the purposes of illustration, it will be evident to those skilled in the art that numerous variations and details of the instant invention may be made without departing from the instant invention as defined in the appended claims.

I claim:

1. A metallurgical vessel for holding a molten metal having a layer of slag thereon comprising:
    a shell having a metallic exterior and a refractory lined interior, said refractory lined interior having sides and a sloping bottom surface exposed to the interior of said vessel, and wherein said sloping bottom surface has a tapered upper surface terminating at a vertical surface, said vertical surface terminating at a lower tapered surface for forming a pocket block reservoir, said pocket block reservoir having a volume of less than or equal to about five percent of the total volume of said metallurgical vessel, and wherein said pocket block reservoir includes a tap hole located at said lower tapered surface for draining said molten metal from said metallurgical vessel.

2. The metallurgical vessel of claim 1 wherein said sloping bottom surface has an angle of inclination of greater than or equal to about three degrees.

3. The metallurgical vessel of claim 1 wherein said pocket block reservoir has a volume of less than or equal to about three percent of the total volume of said metallurgical vessel.

4. The metallurgical vessel of claim 1 including an impact pad positioned on said sloping bottom surface.

5. The metallurgical vessel of claim 1 wherein said tap hole is located at a lowest region of said pocket block reservoir.

6. The metallurgical vessel of claim 1 wherein said tap hole is located at the center of said pocket block reservoir.

7. A method for improving the yield efficiency of a metallurgical vessel for holding a molten metal having a layer of slag thereon comprising:

employing a metallurgical vessel comprising a shell having side walls and a bottom to form an interior of said metallurgical vessel for containing a molten metal;

forming a refractory lining covering the interior of said side walls and bottom of said vessel wherein said refractory lining forms a sloping bottom surface exposed to the interior of said vessel, wherein said sloping bottom surface has a tapered upper surface terminating at a vertical surface, said vertical surface terminating at a lower tapered surface for forming a pocket block reservoir, said pocket block reservoir having a volume of less than or equal to about five percent of the total volume of said vessel, and said pocket block reservoir having a tap hole having an opening located at said lower tapered surface for providing drainage of said vessel, wherein said tap hole having a removable tap hole cover means in juxtaposition to said tap hole for opening and closing said tap hole opening;

placing said removable tap hole cover means in the closed position under said tap hole opening;

placing said molten metal into said vessel and allowing sufficient volume for a layer of slag on top of said molten metal within said vessel for the formation of a slag-molten metal interface;

draining said vessel by moving said removable tap hole cover means in the open position for allowing said molten metal within said vessel to collect in said pocket block reservoir and then to pass through said tap hole opening; and moving said removable tap hole cover means in the closed position simultaneously with, before or after the entry of said slag into said pocket block reservoir for increasing the yield of said molten metal discharged from said vessel.

8. The method of claim 7 including employing said sloping bottom surface having an angle of inclination of greater than or equal to about three degrees.

9. The method of claim 7 including employing a pocket block reservoir having a volume of less than or equal to about three percent of the total volume of said vessel.

10. The method of claim 7 including positioning said tap hole at a lowest region of said pocket block reservoir.

11. The method of claim 7 including positioning said tap hole in the center of said pocket block reservoir.

12. The method of claim 7 including positioning an impact pad on said sloping bottom surface.

\* \* \* \* \*